US005693307A

United States Patent [19]

Bowden et al.

[11] Patent Number: 5,693,307
[45] Date of Patent: Dec. 2, 1997

[54] PROCESS FOR MAKING A LITHIATED LITHIUM MANGANESE OXIDE SPINEL

[75] Inventors: William L. Bowden, Nashua, N.H.; Andrew Kallmes, Cambridge; Enoch Wang, Mansfield, both of Mass.

[73] Assignee: Duracell, Inc., Bethel, Conn.

[21] Appl. No.: 474,806

[22] Filed: Jun. 7, 1995

[51] Int. Cl.$^6$ .................................. C01G 45/12
[52] U.S. Cl. .................................. 423/599; 429/224
[58] Field of Search .................. 423/599; 429/224

[56] References Cited

U.S. PATENT DOCUMENTS

| | | | |
|---|---|---|---|
| 4,070,529 | 1/1978 | Delmas et al. | 429/193 |
| 4,246,253 | 1/1981 | Hunter | 423/605 |
| 4,312,930 | 1/1982 | Hunter | 429/191 |
| 4,366,215 | 12/1982 | Coetzer et al. | 429/199 |
| 4,507,371 | 3/1985 | Thackeray et al. | 429/191 |
| 4,959,282 | 9/1990 | Dahn et al. | 429/224 |
| 4,980,251 | 12/1990 | Thackeray et al. | 429/224 |
| 5,135,732 | 8/1992 | Barboux et al. | 423/593 |
| 5,153,081 | 10/1992 | Thackeray et al. | 429/194 |
| 5,160,712 | 11/1992 | Thackeray et al. | 423/138 |
| 5,166,012 | 11/1992 | Rossouw et al. | 429/224 |
| 5,192,629 | 3/1993 | Guyomard et al. | 429/197 |
| 5,196,279 | 3/1993 | Tarascon | 429/194 |
| 5,244,757 | 9/1993 | Takami et al. | 429/194 |
| 5,262,255 | 11/1993 | Ito et al. | 429/217 |
| 5,266,299 | 11/1993 | Tarascon | 423/599 |
| 5,294,499 | 3/1994 | Furukawa et al. | 429/164 |
| 5,316,877 | 5/1994 | Thackeray et al. | 429/197 |
| 5,370,710 | 12/1994 | Nagaura et al. | 423/599 |
| 5,425,932 | 6/1995 | Tarascon | 423/599 |

FOREIGN PATENT DOCUMENTS

| | | | |
|---|---|---|---|
| 3-84874 | 4/1991 | Japan | H01M 10/40 |
| 3-225750 | 10/1991 | Japan | H01M 4/04 |
| 4-169065 | 6/1992 | Japan | H01M 4/58 |
| 5-135802 | 6/1993 | Japan | H01M 10/40 |

OTHER PUBLICATIONS

Abstract to article by Barboux et al, J. Solid State Chem., 94 (1) 185-96 (English) 1991.

"The $Li_{1+x}$ $Mn_2O_4$/C Rocking Chair System: A Review", Tarascon and Guyomard, Bellcore, Red Bank, NJ 07701 (1992).

"Lithium Manganese Oxide Rechargeable Batteries", T. Nagaura, JEC Battery Newletter No. 2 (Mar-Apr. 1991).

*Primary Examiner*—Wayne Langel
*Attorney, Agent, or Firm*—Barry D. Josephs; Paul I. Douglas

[57] ABSTRACT

Disclosed is a process for making a lithiated lithium manganese oxide spinel of the formula $Li_{(1+x)}Mn_2O_4$ comprising contacting a lithium manganese oxide spinel of the formula $LiMn_2O_4$ with a lithium carboxylate compound, at a temperature and for a time sufficient to decompose the carboxylate compound and free the lithium to form said lithiated spinel.

10 Claims, No Drawings

PROCESS FOR MAKING A LITHIATED LITHIUM MANGANESE OXIDE SPINEL

The present invention relates to an improved process for making a lithiated spinel compound. In particular, the invention relates to a process for lithiating a lithium manganese oxide spinel to form a spinel featuring excess lithium, which is useful as an electrochemically active component in a secondary electrochemical cell.

Lithium secondary, electrochemical cells, or rechargeable cells, typically include a Li-bearing intercalation compound as the positive electrode and a carbon, typically graphite, negative electrode, separated by a non-aqueous lithium-ion electrolyte. A lithium manganese oxide spinel of the general formula $LiMn_2O_4$ commonly has been employed as the electrochemically active cathode component. Studies of lithium intercalation into graphite have shown, however, that when the lithium manganese oxide spinel is used in a lithium-ion rechargeable cell in which the anode or negative electrode is graphite, there is a marked, detrimental irreversible loss in capacity during the first recharging cycle. The initial approach to overcome this problem was simply to use a larger mass of positive electrode [$(1+x)LiMn_2O_4$] to compensate for the loss of lithium on the graphite anode during the first cycle. However, increasing the mass of the cathode is not an effective remedy when taking performance efficiency into consideration. In order to offset the lithium loss without, undesirably, seriously impacting massic or volumetric performance characteristics of the cell, lithiated lithium manganese oxide spinel structures have been developed which feature excess lithium ($Li_{(1+x)}Mn_2O_4$). This excess lithium in the spinel compound is available to compensate for the initial loss of lithium associated with the negative electrode, while reserving an amount of lithium needed to balance the reversible capacity of the graphite and maintain a useful energy level in the cell.

While such lithiated lithium manganese oxide spinel compounds have proven to be a useful and effective cathode material in secondary or rechargeable electrochemical cells, presently known methods for producing the $Li_{(1+x)}Mn_2O_4$ spinel are expensive and difficult to scale up from laboratory size to commercial volume. One such method of production, for example, includes subjecting $LiMn_2O_4$ to a reducing reaction with a heated solution of lithium iodide (LiI) in acetonitrile; another involves a reduction of the lithium manganese oxide spinel with a solution of n-butyl lithiate (n-BuLi) in hexane. Both of these lithium-containing reactants are prohibitively expensive, the production processes involve organic solvents, and, in addition, the n-BuLi features hazardous, pyrophoric properties. Accordingly, there is a need for a viable method for commercial production of the lithiated lithium manganese oxide spinel.

It now has been discovered that a lithiated lithium manganese oxide spinel of the formula $Li_{(1+x)}Mn_2O_4$ can economically be made by a simple method which comprises contacting a lithium manganese oxide spinel of the formula $LiMn_2O_4$ with a lithium carboxylate compound, at a temperature and for a time sufficient to decompose the carboxylate compound and free the lithium to form said lithiated, $Li_{(1+x)}Mn_2O_4$ spinel. This lithiated spinel compound has been found to be particularly useful as the positive electrode of a lithium-ion secondary electrochemical cell.

The present process produces a lithiated lithium manganese oxide spinel of the formula $Li_{(1+x)}Mn_2O_4$, wherein $0<x\leq 1$; preferably, the value of x ranges from about 0.05 to about 1.0; most preferably, x ranges from about 0.05 to about 0.3.

The process is carried at a reaction temperature sufficient to decompose the lithium carboxylate reactant and form the lithiated spinel compound, but, below about 350° C., to avoid decomposition of the spinel compound. Above about 300° C. the spinel compound begins to decompose into non-spinel decomposition products such as $Li_{(1+x)}MnO_3$ and $MnO_2$, which are not useful as cathode components in a lithium secondary electrochemical cell. The reaction temperature generally ranges from about 150° C. to about 300° C.; preferably, the reaction temperature ranges from about 230° C. to about 250° C.

Reaction time is dependent upon choice of reactants and reaction temperature. In general, reaction time ranges from about 10 minutes to about 15 hours; preferably about 2 to about 8 hour reaction times are employed, since such times have been found to provide favorable results.

Preferably, the synthesis is conducted in an inert atmosphere to avoid oxidation reactions resulting in the formation of by products undesirable for electrochemical cathode utility, such as $Li_2CB_3$ and/or $Li_2MnO_3$. Suitable inert atmospheres include the noble gases (Me, Ne, Ar, Kr, Xe, and Rn), vacuum, and combinations thereof, and the like. An argon atmosphere is preferred.

The lithium carboxylate reactant employed in the present process is any lithium salt of mono and polycarboxylic acids, which features a decomposition temperature below about 300° C., and which is effective to lithiate a $LiMn_2O_4$ spinel when heated in contact with said spinel at a temperature below about 300° C. Examples of suitable lithium carboxylates useful in the present process include lithium acetate, lithium citrate, lithium formate, lithium lactate, other lithium carboxylates in which the carboxylate group is attached to a group that is election-withdrawing relative to methyl (such as hydrogen, perfluoroalkyl, $CF_3SO_2CH_2$, and $(CF_3SO_2)_2N$), and the like. Lithium acetate is particularly preferred as the lithium carboxylate reactant.

The process of the present invention may be practiced using various techniques. In one embodiment, particulate $LiMn_2O_4$ spinel first is mixed with a solution, preferably an aqueous solution, of lithium carboxylate to form a paste. Then, the paste is dried to remove the solvent and the so-formed intimate admixture of spinel and carboxylate is heated to a temperature and for a time sufficient to decompose the carboxylate and initiate reaction to form the $Li_{(1+x)}Mn_2O_4$ spinel.

In another alternative embodiment of the process, the particulate $LiMn_2O_4$ spinel and the lithium carboxylate salt are dry-mixed to form an intimate mixture. The dry admixture then is heat treated to lithiate the spinel to form the desired $Li_{(1+x)}Mn_2O_4$ product. Any suitable dry mixing technique may be used to form the reactant mixture; such techniques include drum mixers, ball mixers, rod mixers, and the like.

In a preferred process, lithium acetate; as the lithium carboxylate reactant, is dissolved in water, and lithium manganese oxide spinel is added to the solution to form a paste. The LiOAc/$LiMn_2O_4$ paste then is air dried at a temperature of about 50° C. to about 150° C., preferably about 100° C. The dried admixture next is reacted by heating it in an argon atmosphere to a temperature from about 230° C. to about 250° C. for a period of about 2 to about 8 hours.

The following examples are provided to further illustrate the invention.

EXAMPLE 1

Lithiated spinel of the formula $Li_{1.1}Mn_2O_4$ is prepared by dissolving 1.695 grams of lithium acetate (LiOAc) in about 30 ml of deionized (DI) water. A stoichiometric amount of particulate lithium manganese oxide $LiMn_2O_4$ spinel, 30 grams, is added to the LiOAc solution and the resulting slurry is stirred to keep the spinel in suspension and to ensure homogeneity between the spinel and LiOAc reactants, while the slurry is heated at 80°–90° C. for about 3 hours to remove excess water and convert the slurry into a paste. The paste then is vacuum dried at 80° C. The resulting powder is slowly heated, in a tube furnace in the presence of flowing argon, from room temperature to 250° C. over a period of 1.5 hours, and is held at that temperature for 2 hours to form a bluish black powder product. The powder is cooled to 110° C. over a period of 3 hours in flowing argon. During the reaction, water condenses at the downstream end of the tube furnace. Weight loss during the reaction is about 17–20% of the combined weight of the LiOAc and spinel reactants. The $Li_{1.1}Mn_2O_4$ spinel powder product is analyzed by atomic absorption (AA) for Li and Mn concentration and characterized by X-ray powder diffraction (XRD) analysis.

EXAMPLE 2

Lithiated spinel of the formula $Li_{1.2}Mn_2O_4$ is prepared from lithium acetate by dissolving 3.39 grams of LiOAc in about 30 ml of dionized (DI) water. A stoichiometric amount of particulate $LiMn_2O_4$ spinel, 30 grams, is added to the LiOAc solution and the resulting slurry is stirred to keep the spinel in suspension and to ensure homogeneity between the spinel and LiOAc reactants while heating at 80°–90° C. for about 3 hours to remove excess water until the slurry turns into a paste. The paste then is vacuum dried at 80° C. The resulting powder is slowly heated, in a tube furnace in the presence of flowing argon, from room temperature to 250° C. over a period of 1.5 hours, and is held at that temperature for 2 hours to form the $Li_{1.2}Mn_2O_4$ spinel product, a bluish black powder. The powder is cooled to 110° C. over a period of 3 hours in flowing argon. During the reaction, water condenses at the downstream end of the tube furnace. The $Li_{1.2}Mn_2O_4$ spinel powder is characterized by X-ray powder diffraction (XRD) analysis and analyzed by atomic absorption (AA) for Li and Mn concentration to confirm its structure.

EXAMPLE 3

Lithiated spinel of the formula $Li_2Mn_2O_4$ is prepared by dissolving 16.95 grams of lithium acetate (LiOAc) in about 30 ml of dionized (DI) water. A stoichiometric amount of particulate $LiMn_2O_4$ spinel, 30 grams, is added to the LiOAc solution and the resulting slurry is stirred to keep the spinel in suspension and the ensure homogeneity between the spinel and LiOAc reactants while the slurry is heated at 80°–90° C. for about 3 hours to remove excess water until the slurry turns into a paste. The paste then is vacuum dried at 80° C. The resulting powder is slowly heated, in a tube furnace in the presence of flowing argon, from room temperature to 250° C. over a period of 1.5 hours, and held at that temperature for two hours. The powder is cooled to 110° C. over a period of 3 hours in flowing argon. During the reaction, water condenses at the downstream end of the furnace. A color change from bluish black to brown is observed during the reaction and the $Li_2Mn_2O_4$ spinel product has a brown color which is different from the bluish black color of the $LiMn_2O_4$ spinel reactant. The $Li_2Mn_2O_4$ spinel powder is characterized by X-ray powder diffraction (XRD) analysis and analyzed by atomic absorption (AA) for Li and Mn concentration.

EXAMPLE 4

Lithiated spinel of the formula $Li_{1.1}Mn_2O_4$ is prepared by dissolving 3.482 grams of lithium citrate in about 30 ml of deionized water. A stoichiometric amount of $LiMn_2O_4$, 30 grams, is added to the lithium citrate solution and the resulting slurry is stirred to keep the spinel in suspension and to ensure homogeneity between the spinel and lithium citrate reactants. The slurry is heated at 80°–90° C. for about 3 hours while stirring to remove excess water until the slurry turns into a paste. The paste then is vacuum dried by heating at 80° C. for about 3 hours. The resulting powder is slowly heated, in a tube furnace in the presence of flowing argon, from room temperature to 250° C. over a period of 1.5 hours and held at that temperature for 2 hours to form a bluish black powder product. The powder then is cooled to 110° C. over a period of 3 hours in flowing argon. During the reaction, water is seen condensing at the downstream end of the flowing tube furnace. Weight loss during the reaction is about 40–45% of the combined weight of the citrate and spinel reactants. The powder is characterized by XRD and analyzed by atomic absorption (AA) for Li and Mn concentration to confirm its structure as $Li_{1.1}Mn_2O_4$ spinel.

EXAMPLE 5

Lithiated $Li_{1.2}Mn_2O_4$ spinel is prepared by dissolving 6.964 grams of lithium citrate in about 30 ml of deionized water. A stoichiometric amount of $LiMn_2O_4$, 30 grams, is added to the lithium citrate solution and the resulting slurry is stirred to keep the spinel in suspension and to ensure homogeneity between the spinel and lithium citrate reactants. The slurry then is heated at 80°–90° C. for about 3 hours while stirring to remove excess water until the slurry turns into a paste. The paste is vacuum dried by heating at 80° C. for a few hours. The resulting powder is slowly heated, in a tube furnace in the presence of flowing argon, from room temperature to 250° C. over a period of 1.5 hours and held at that temperature for 2 hours to form a powder product. The powder is cooled to 110° C. over a period of 3 hours in flowing argon. During the reaction, water is seen condensing at the downstream end of the flowing tube furnace. A color change from bluish black to brown is observed during the reaction and the powder product has a brown color which is different from the bluish black color of the $LiMn_2O_4$ spinel reactant. The powder product is characterized by XRD and analyzed for Li and Mn concentration to confirm its structure as $Li_{1.2}Mn_2O_4$ spinel.

EXAMPLE 6

Lithiated spinel of the formula $Li_2Mn_2O_4$ is prepared by dissolving 34.82 grams of lithium citrate in about 30 ml of deionized water. A stoichiometric amount of particulate $LiMn_2O_4$ spinel, 30 grams, is added to the lithium citrate solution and the resulting slurry is stirred to keep the spinel in suspension and to ensure homogeneity between the spinel and lithium citrate reactants while the slurry is heated at 80°–90° C. for about 3 hours to remove excess water until the slurry turns into a paste. The paste then is vacuum dried at 80° C. The resulting powder is slowly heated, in a tube furnace in the presence of flowing argon, from room temperature to 250° C. over a period of 1.5 hours, and held at that temperature for 2 hours to form a powder product. The powder is cooled to 110° C. over a period of 3 hours in flowing argon. During the reaction, water is condensed at the downstream end of the tube furnace. A color change from bluish black to brown is observed during the reaction and the powder product has a brown color which is different from the bluish black color of the LiMn$_2$O$_4$ spinel reactant. The powder product is characterized by X-ray powder diffraction (XRD) analysis and analyzed by atomic absorption (AA) for Li and Mn concentration to confirm its structure as Li$_2$Mn$_2$O$_4$ spinel.

EXAMPLE 7

Lithiated Li$_{1.1}$Mn$_2$O$_4$ spinel is prepared by dissolving 1.591 grams of lithium lactate in about 30 ml of deionized (DI) water. A stoichiometric amount of particulate LiMn$_2$O$_4$ spinel, 30 grams, is added to the LiOAc solution and the resulting slurry is stirred to keep the spinel in suspension and to ensure homogeneity between the spinel and LiOAc reactants while heating at 80°–90° C. for about 3 hours to remove excess water until the slurry turns into a paste. The paste is vacuum dried at 80° C. The resulting powder is slowly heated, in a tube furnace in the presence of flowing argon, from room temperature to 250° C. over a period of 1 hour and held at that temperature for 2 hours to form a bluish black powder product. The powder is cooled to 110° C. over a period of 3 hours in flowing argon. During the reaction, water condenses at the downstream end of the tube furnace. Weight loss during the reaction is about 20% of the combined weight of the lithium lactate and spinel reactants. The powder product is characterized by X-ray powder diffraction (XRD) analysis and analyzed by atomic absorption (AA) for Li and Mn concentration to confirm its structure as Li$_{1.1}$Mn$_2$O$_4$ spinel.

EXAMPLE 8

Lithiated Li$_2$Mn$_2$O$_4$ spinel is prepared from lithium lactate by dissolving 3.182 grams of lithium lactate in about 30 ml of deionized (DI) water. A stoichiometric amount of particulate LiMn$_2$O$_4$ spinel, 30 grams, is added to the LiOAc solution and the resulting slurry is stirred to keep the spinel in suspension and to ensure homogeneity between the spinel and LiOAc reactants while the slurry is heated at 80°–90° C. for about 3 hours to remove excess water until the slurry turns into a paste. The paste then is vacuum dried at 80° C. The resulting powder is slowly heated, in a tube furnace in the presence of flowing argon, from room temperature to 250° C. over a period of I hour, and held at that temperature for 2 hours to form a bluish black powder product. The powder is cooled to 110° C. over a period of 3 hours in flowing argon. During the reaction, water is condensed at the downstream end of the tube furnace. The powder product is characterized by X-ray powder diffraction (XRD) analysis and analyzed by atomic absorption (AA) for Li and Mn concentration to confirm its structure as Li$_{1.2}$Mn$_2$O$_4$ spinel.

EXAMPLE 9

Lithiated Li$_2$Mn$_2$O$_4$ spinel is prepared by dissolving 15.91 grams of lithium lactate in about 30 ml of deionized (DI) water. A stoichiometric amount of particulate LiMn$_2$O$_4$ spinel, 30 grams, is added to the LiOAc solution and the resulting slurry is stirred to keep the spinel in suspension and to ensure homogeneity between the spinel and LiOAc reactants while the slurry is heated at 80°–90° C. for about 3 hours to remove excess water until the slurry turns into a paste. The paste then is vacuum dried at 80° C. The resulting powder is slowly heated in a tube furnace an the of flowing argon, from room temperature to 250° C. over a period of 1 hour, and held at that temperature for 2 hours to form a powder product. The powder is cooled to 110° C. over a period of 3 hours in flowing argon. During the reaction, water condenses at the downstream end of the tube furnace. A color change from bluish black to brown is observed during the reaction and the powder product has a brown color which is different from the bluish black color of the LiMn$_2$O$_4$ spinel reactant. The powder product is characterized by X-ray powder diffraction (XRD) analysis and analyzed by atomic absorption (AA) for Li and Mn concentration to confirm its structure as Li$_2$Mn$_2$O$_4$ spinel.

What is claimed is:

1. A process for preparing a lithiated lithium manganese dioxide spinel compound of the formula Li$_{(1+x)}$Mn$_2$O$_4$ wherein $0<x\leq 1$, comprising reacting lithium manganese dioxide spinel compound of the formula LiMn$_2$O$_4$ with a lithium carboxylate at a temperature and for a time sufficient to decompose said carboxylate and form the lithiated spinel.

2. The process of claim 1 wherein the lithium carboxylate is selected from the group consisting of lithium acetate, lithium citrate, lithium lactate, and other lithium carboxylates in which the carboxylate group is attached to a group that is electron-withdrawing relative to methyl.

3. The process of claim 2 wherein the lithium carboxylate is lithium acetate.

4. The process of claim 1 wherein the reaction takes place at a temperature between about 150° C. to below about 350° C.

5. The process of claim 4 wherein the temperature ranges from about 150° C. to below about 300° C.

6. The process of claim 4 wherein the temperature ranges from about 230° C. to about 250° C.

7. The process of claim 1 wherein the time of reaction ranges from about 10 minutes to about 15 hours.

8. The process of claim 6 wherein the time of reaction ranges from about 2 to about 8 hours.

9. The process of claim 1 wherein the reaction is conducted in an inert atmosphere.

10. The process of claim 1 wherein the lithium manganese dioxide spinel compound is reacted with lithium acetate at a temperature of about 230° C. to about 250° C. for a period of about 2 to about 8 hours in an inert argon atmosphere.

* * * * *